United States Patent
Wilson et al.

(10) Patent No.: US 8,408,766 B2
(45) Date of Patent: Apr. 2, 2013

(54) LUMINOUS INTERIOR TRIM MATERIAL

(75) Inventors: Ernie Wilson, Albemarle, NC (US); Mitchell Whitesell, North Troy, NY (US); Sean Simmons, Kannapolis, NC (US)

(73) Assignee: International Automotive Components Group North America, Inc, Dearborn, MI (US)

( * ) Notice: Subject to any disclaimer, the term of this patent is extended or adjusted under 35 U.S.C. 154(b) by 261 days.

(21) Appl. No.: 12/517,789

(22) PCT Filed: Nov. 7, 2007

(86) PCT No.: PCT/US2007/083941
§ 371 (c)(1),
(2), (4) Date: Dec. 7, 2009

(87) PCT Pub. No.: WO2008/058194
PCT Pub. Date: May 15, 2008

(65) Prior Publication Data
US 2010/0084575 A1    Apr. 8, 2010

Related U.S. Application Data

(60) Provisional application No. 60/864,728, filed on Nov. 7, 2006.

(51) Int. Cl.
*B60Q 3/06* (2006.01)
*F21V 9/16* (2006.01)
(52) U.S. Cl. ............... 362/496; 362/84; 362/510
(58) Field of Classification Search ............ 362/84, 362/479, 488, 490, 496, 510, 459, 509; 250/461.1
See application file for complete search history.

(56) References Cited

U.S. PATENT DOCUMENTS

| | | | | |
|---|---|---|---|---|
| 3,444,637 A | * | 5/1969 | Joy | 40/428 |
| 3,635,832 A | * | 1/1972 | Toney | 252/301.34 |
| 4,169,702 A | | 10/1979 | Fleck et al. | |
| 4,205,991 A | | 6/1980 | Becker et al. | |
| 4,211,813 A | | 7/1980 | Gravisse et al. | |
| 4,413,998 A | | 11/1983 | Guth et al. | |
| 4,725,281 A | * | 2/1988 | Stehlin et al. | 8/107 |
| 5,286,922 A | * | 2/1994 | Curtiss | 174/112 |
| 5,604,407 A | | 2/1997 | Andres et al. | |
| 5,645,663 A | | 7/1997 | Nakayama et al. | |

(Continued)

FOREIGN PATENT DOCUMENTS

| JP | 05229385 | | 9/1993 |
|---|---|---|---|
| JP | 05229385 A | * | 9/1993 |

(Continued)

OTHER PUBLICATIONS

Machine Translation of JP 05-229385.*

(Continued)

*Primary Examiner* — Alan Cariaso
(74) *Attorney, Agent, or Firm* — Grossman, Tucker, Perreault + Pfleger, PLLC

(57) ABSTRACT

The present invention relates to surfacing material which may emit radiation in response to exposure to a given light source. Such surfacing material may be polymeric based, and e.g., fiber based, and may be used in relatively low-light areas, including low-light areas as applied to vehicular applications. The fiber-based or molded materials may emit radiation in response to exposure to a selected light source and may be used in relatively dimly lit areas. The materials may also provide a visible contrast to other objects located adjacent their surface which do not emit radiation. Optical brighteners and luminous particles may be included in the materials to make them luminous.

14 Claims, 1 Drawing Sheet

U.S. PATENT DOCUMENTS

| | | | |
|---|---|---|---|
| 5,674,437 | A | 10/1997 | Geisel |
| 5,695,696 | A | 12/1997 | Hensler et al. |
| 5,714,255 | A | 2/1998 | Yeh |
| 5,830,241 | A | 11/1998 | Rohringer et al. |
| 5,840,788 | A * | 11/1998 | Lutz et al. .................. 524/95 |
| 5,853,614 | A | 12/1998 | Hao et al. |
| 5,914,076 | A | 6/1999 | Schloss |
| 5,997,161 | A | 12/1999 | Stringfellow et al. |
| 6,074,748 | A | 6/2000 | Ogata |
| 6,162,539 | A | 12/2000 | Shimizu et al. |
| 6,375,864 | B1 | 4/2002 | Phillips et al. |
| 6,514,609 | B1 | 2/2003 | Siggel et al. |
| 6,680,116 | B2 | 1/2004 | Siggel et al. |
| 6,692,667 | B2 | 2/2004 | Kyeng-Jung |
| 6,733,166 | B2 | 5/2004 | Hulse |
| 6,773,129 | B2 | 8/2004 | Anderson, Jr. et al. |
| 6,871,986 | B2 * | 3/2005 | Yamanaka et al. ............ 362/490 |
| 6,926,962 | B2 | 8/2005 | Yamazaki et al. |
| 6,935,763 | B2 | 8/2005 | Mueller et al. |
| 2002/0159270 | A1 * | 10/2002 | Lynam et al. .................. 362/492 |
| 2003/0050425 | A1 * | 3/2003 | Kennedy et al. ................. 528/55 |
| 2004/0157520 | A1 * | 8/2004 | Huang et al. .................. 442/185 |

FOREIGN PATENT DOCUMENTS

| | | | |
|---|---|---|---|
| JP | 11004733 | | 1/1999 |
| JP | 11004733 A * | | 1/1999 |
| JP | 2000344022 | | 12/2000 |
| JP | 2000344022 A * | | 12/2000 |
| JP | 2000142547 | | 10/2001 |

OTHER PUBLICATIONS

Machine Translation of JP 11-004733.*

Machine Translation of JP 2000-344022.*

Wiley-VCH, "Ullmann's Encyclopedia of Industrial Chemistry, Table of Contents, Optical Brighteners," Sixth Edition, Jun. 2001 Electronic Release; available at http://mcatechnologies.com/Optical%20Brighteners_%20Ullmann's%20Encylopedia%20of.htm; retrieved on Nov. 6, 2009.

Pharr Yarns, "Yarn Product Information, Upholstery Group, Carpet Group" available at http://www.pharryarns.com/ ; retrieved on Nov. 6, 2009.

Wikipedia, "Stilbene" available at http://en.wikipedia.org/wiki/(E)-Stilbene; retrieved on Nov. 5, 2009.

Ciba, "Product List for UVITEX," available at http://www.ciba.com/pf/?search=1&refresh=0&ind=&DApname=uvitex; retrieved on Nov. 5, 2009.

Wikipedia, "Optical Brightener," available at http://en.wikipedia.org/wiki/Optical_brightener; retrieved on Nov. 5, 2009.

Mayzo, "Bentex OB-Plus, Optical Brightener, Fluorescent Whitening Agent," available at http://www.mayzo.com/pdf/BenetexOB-EP.pdf; retrieved on Nov. 5, 2009.

Millington, "Generation of Superoxide and Hydrogen Peroxide by Exposure of Stilbene-based Fluorescent Whitening Agents to UVA Radiation," available at http://www.photobiology.com/v1/Millington/; retrieved on Nov. 5, 2009.

* cited by examiner

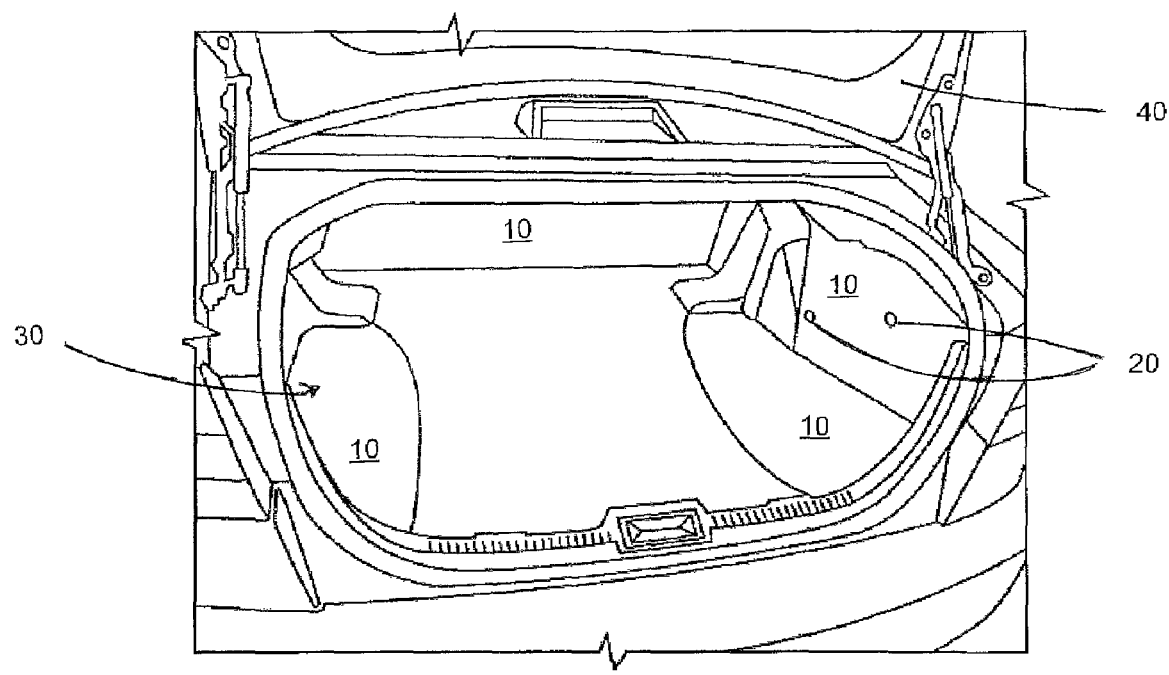

LUMINOUS INTERIOR TRIM MATERIAL

CROSS-REFERENCE TO RELATED APPLICATIONS

This application claims priority to U.S. Provisional Application No. 60/864,728, filed Nov. 7, 2006.

FIELD

This disclosure relates generally to interior illumination provided by a trim material. In particular, to trim materials for the floor, trunk and/or cargo space that are luminous due to compositional considerations and which may provide a contrast in appearance to other items located or stored in relatively darkened locations.

BACKGROUND

It is known to provide lighting for various locations in a vehicle by utilizing a number of discreet incandescent bulbs or other light sources in the immediate area where illumination is desired. More recently, distributed light systems have found use in the vehicle. These may use fiber optics or other means to deliver the light to a desired location. The use of a lens and focusing or dispersing devices may be employed to direct the light. For example, what started with a single vehicular dome light has now progressed to as many as 40 lights distributed through the vehicle to illuminate a wide variety of functional areas.

Such areas as foot wells, door handles, seats, trunks, cargo areas, dashboards, door sills, headliners, grab handles, etc. may be illuminated using a wide combination of technologies. In addition to incandescent lights and fluorescent lighting, LED illumination, cold cathode technology, and electroluminescent technology may now find use, further adding to the problem of how to most efficiently manage the many locations and differing technologies.

Vehicle lighting tends to be relatively inadequate in trunk areas, cargo spaces, around door sills and in foot wells, all of which are generally trimmed with darkly colored carpeting.

The problem is exacerbated in the evening and in dimly lit garages where ambient light is relatively low.

SUMMARY

The present disclosure is directed in one exemplary embodiment at the use of fibers which are capable of emitting radiation when exposed to a given light source. The fibers may be formed into a desired shape for a given environment that may require improved levels of lighting. In one exemplary embodiment, the fibers herein may be employed in a vehicular trim component, but it may be appreciated that the fibers herein may be used in other desired locations.

It may therefore be appreciated that the trim component may be a molded carpet for a trunk or cargo area comprising tufted fibers or nonwoven fibers which have been treated with an optical brightener or whiteners. The light source may include an ultraviolet light source. The light source may also include a black light or other source of radiation that provides the ultraviolet A band (UVA).

In another exemplary embodiment, the fibers may be formed into a web which may be treated with a brightener or whitener and then formed into a floor covering for foot wells, as well as trim components for lower door panels and door sill trim.

In yet another exemplary embodiment, the treated fibers may comprise a flock (relatively short fibers that are applied to an adhesive type surface) which may be used to coat the inside of a storage bin such as for a glove box, center console or armrest bin.

In a still further another exemplary embodiment, yarn, which is used to produce the tufted fibers for a carpet section on the lower surface of a door panel, may be formed from a combination of a polymer, such as polyamide, polyester or polyolefin and a fluorescent or phosphorescent dye or pigment.

In another exemplary embodiment, a trim panel may be injection molded from plastic pellets prepared from the combination of a polymer and one or more fluorescent or phosphorescent pigments incorporated as an additive in the polymeric resin.

The invention may also be employed where only selected sections of a trim panel may be luminous by masking off areas of a carpet when it is treated, or by the weaving or knitting of a combination of treated and untreated fibers, or by co-injection molding of a polymer containing a phosphorescent pigment adjacent a polymer which does not include the dye or pigment. This may provide decoration such as for logos as well as providing a contrast when exposed to the appropriate light source in a dark area to assist in viewing, for instance, the contents of a vehicle trunk.

The invention may also be employed to provide additional decoration by utilizing secondary light sources at different light frequencies to emit colors other than, or in addition to, the light blue/white hue produced by contemplated primary light sources. This may be used for purposes including embellishing logos in a dark environment and providing harmony/contrast to other associated materials present.

As alluded to above, it is contemplated that in addition to finding use in motor vehicles, this invention may also be used to provide a surfacing material for lighting in other transportation equipment such as boats, airplanes and trains. In addition, the invention herein may be utilized in any darkened storage area, such as, closets, garages, basements, attics, etc. In addition, at least a portion of the surface of an area may be trimmed with a covering material which emits radiation in response to a light source such as UVA.

In this manner, relatively darkened or shaded areas may have improved illumination, not just by a remote light directed into the area but by the absorption of radiation, preferably ultraviolet (4-400 nm) and more preferably UVA band radiation (about 320 nm -400 nm) and the emitting of visible light by the fibers, or resins, which make up the materials used to trim such darkened or shaded areas. This, in turn, may provide a contrasting appearance to objects placed on or adjacent the emitting surface, particularly if the objects are not luminous. In addition, the trim components may illuminate without generating a shadow.

BRIEF DESCRIPTION OF THE DRAWING

The features, operation and advantages of the invention may be better understood from the following detailed description of the preferred embodiments taken in conjunction with the attached drawing, in which:

FIG. 1 is a perspective view of an automobile trunk including luminous molded carpet sections, according to the present invention.

DETAILED DESCRIPTION

The present invention is described more fully hereinafter in which various exemplary embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Darkened or shaded areas in vehicles such as foot wells, door sills, storage areas, etc. provide both safety issues and inconvenience. In the evening, it becomes relatively difficult to see items dropped onto the floor or a seat. This may even be the case with the present level of interior lighting provided by vehicle manufacturers.

It has been found that the use of an ultraviolet light source, for instance a black light, directed at trim components which have been treated or chemically modified to fluoresce or phosphoresce, may provide a visible contrast between any items stored or located adjacent the trim components and the trim components themselves. The exemplary benefits of this feature are that the contrast may provide convenience as well as safety benefits by lighting foot wells, carpets, doorsill trim, door and grab handles, trunk and cargo trim, etc. In addition, the trim components may illuminate without generating a shadow.

The trim components may be formed from fibers which have been treated with an optical brightener or whitener. The fibers may be processed into woven, non-woven, knitted and/or tufted materials and formed to a desired shape. Alternatively, the fibrous material may be processed into a web or tufted and then treated with the optical brightener. Optical brighteners (which may provide a relatively light blue or relatively white color) may create brilliance by absorbing UV light in the ultraviolet and violet region of the electromagnetic spectrum, modifying the wavelength of the light and the emitting the light in the blue region.

Generally, for use in the specific areas of the vehicle as noted above, these trim components, and the fibers they are produced from are of a relatively darker color so as to not show dirt. When treated with an optical brightener, often as part of the dyeing process, and then exposed to a source of UVA light, the fibers may emit radiation and appear lighter, often with a light blue hue, than other items located nearby. This then may provide a highly visible contrast between a radiation emitting surface and non-emitting objects stored on or near the treated trim components.

This may be particularly true for areas of the vehicle which do not receive direct lighting (corners of the trunk, rear seat foot wells, etc.) or when accessing storage areas of a vehicle parked in a dimly lit garage. The use of a black light, for instance, in the vehicle trunk, may cause the treated fibers/trim component to appear brighter than other non-emitting objects.

FIG. 1 illustrates the placement of luminescent panels, in the form of non-woven fiber carpet sections 10 in normally unlit area of a vehicle trunk 30. Illumination of these panels by ultraviolet light produced by bulbs 20 placed adjacent the panels 10 provides a surface which emits radiation and provides a backlit contrast to adjacent objects. It is particularly advantageous that with such lighting, no shadow is apparent allowing for a more accurate determination of the shape or position of such adjacent objects. Generally, the ultraviolet light source may be preferably placed about 3 inches to about 18 inches from the luminous trim article, however the luminous effect has been observed over a distance of 60 inches. In the particular application illustrated in FIG. 1, the light source may be activated by opening the trunk lid 40 and power for the light source may be common with that provided for the tail lamps or center high mounted stoplight (CHMSL) etc.

There are various types of optical brighteners which may find use. One class of these is known as stilbenes, for instance, trans-1,2-diphenylethylene. Other classes include coumarin and pyrazoline structures. One such fluorescent dye is umbelliferone. Commercially, Benetex® OB fluorescent whitening agents from Mayzo, Inc. have been found useful. Benetex® OB is believed to be 2,2'-(2,5-thiophenediyl)bis(5-tert-butyl-benzoxazole).

In an exemplary embodiment, a section of non-woven polyester carpet was treated with Uvitex® NFW (Ciba Specialty Chemicals) at a concentration of about 0.5% of the face weight of the carpet. The fluorescent whitening agent was sprayed on to the carpet and the carpet was treated with an excess of steam and dried. When illuminated by a 30 watt black light in a darkened environment, the resultant treated carpet fluoresced with a light blue/white hue in sharp contrast to objects placed on its surface, which appeared relatively dark. The present invention therefore contemplates the use of optical brighteners at concentration of about 0.1-5.0% based upon the carpet face weight, including all values and ranges therein. Uvitex® NFW is believed to be a sulphonated distyryl biphenyl.

Table 1 below illustrates the results obtained in a simulated automobile trunk experiment, using black light tubes of different wattages directed at carpet treated as described in the above exemplary embodiment.

TABLE 1

| Wattage | Bulb Type | Voltage Applied | Distance from Bulb to Carpet | |
|---|---|---|---|---|
| | | | Optimum | Useful |
| 1.5 | tube | 12 | 12" | 60" |
| 3 | tube | 12 | 12" | 60" |
| 4 | tube | 6 | 10" | 60" |
| 18 | tube | 120 | 16" | 60" |

A brilliant appearance in a normally unlit or dimly lit area may be obtained using ultraviolet, particularly black light sources with wattages in the range of about 1.5 to about 30 (including all values and increments therein) and at different voltages when the lamp is placed from about 10 inches to about 16 inches from the luminous trim component. The voltages may therefore vary within the range of about 6-120 volts, including all values and increments therein. Even at lamp to trim component distances of about 60 inches (the normal width of a passenger car trunk) a useful illumination of the darkened space was obtained with the luminous trim materials of the present invention.

In another exemplary embodiment, a section of tufted polyamide carpet was dyed utilizing a continuous dyeing methodology, wherein a concentration of Uvitex® NFW at 0.5% of the face weight of the carpet was included as part of the dye formulation. When illuminated by black light in a darkened environment, the resultant dyed carpet fluoresced with a light blue/white hue in relatively sharp contrast to objects placed on or adjacent to the carpet.

Another method for providing fibers which fluoresce may involve mixing luminous particles into the base polymer which may then be extruded and melt spun, for instance, to provide a fiber which may be formed into trim materials. Once again, the fibers may be woven, non-woven, knitted or tufted to form a trim component for an interior surface of, for instance, a motor vehicle. The luminous particles may include, but are not limited to, metal oxide phosphors and inorganic luminophor pigments. The fibers may include, but are not limited to, polyester, nylon, and olefin (e.g. polypropylene) type materials. The luminous particles may be present at a level of 0.1-5% by weight of the polymer, including all values and ranges therein.

In another exemplary embodiment of the present invention, the aforementioned pigments/luminous particles may be blended into a base polymer and processed by any of the known plastic processes (e.g. injection molding, blow molding, rotational molding, casting, extrusion, calendaring, etc.) to form a shaped article which when exposed to black light may emit radiation and provide a contrast to its surroundings, especially in a dimly lit environment.

These molded articles may be useful as inserts in a given panel or framed around a panel in a vehicle and may act to highlight or distinguish such panels. Specific smaller items, such as, grab handles, door handles, door sills, etc. may provide a margin of safety in the dark if they are capable of emitting radiation (fluorescing) under a given light source. It is further contemplated to provide the luminous fiber or molding as only a portion of the trim component. For instance, treated and untreated fibers may be combined to provide a specific geometric pattern of light emitting fibers. These may even be formed, for instance, by weaving or knitting into a decorative logo.

Areas of trim components may be masked off prior to treatment by spraying to provide decorative patterns that are luminous. Alternatively, trim panels, carpeting, etc. may be used as accessory mats in areas, such as footwells, to highlight a specific darkened area by illuminating with an ultraviolet light. The lights may be actuated by the opening of a door or the trunk lid and therefore may be small and directed locally at a known darkened area in the vehicle.

Molded trim parts may be co-injection molded or co-extruded from polymers which comprise a first material including a luminous pigment and a second material which does not include a luminous pigment. Once again, a decorative pattern or logo may be formed which may only be visible in the presence of ultraviolet light.

Materials, such as the above-mentioned fibers or plastic resins, which may include luminescent dyes or pigments or which may have been treated with an optical brightener have been found to provide an additional source of light or provide a contrasting appearance when exposed to ultraviolet radiation. However, such fibers or plastic resin may not appear any different in appearance than untreated materials under normal (daylight, incandescent, fluorescent) lighting.

Thus, it has been found that improved convenience, safety and appearance may be attained by providing surface materials for relatively dimly lit areas wherein the surface materials comprise plastic fibers or a molded polymer which include an additive which emits light in response to ultraviolet and preferably black light (UVA) illumination. The luminous surfacing materials may, when exposed to a light source such as ultraviolet light, emit radiation providing a contrast in appearance to other items located adjacent or on the surfacing materials.

In addition, the present disclosure provide a relatively improved level of lighting in dark areas, of e.g. a vehicle or any other location that may be relatively dark, which may specifically include a trim material (e.g., carpet, flock, fabric, molded article, etc.) that may be luminous in response to exposure to a light source. This may then illuminate an area and/or provide a contrast to other items which are not luminous and which may be located or stored at a selected vehicular location.

Those skilled in the art will appreciate that still other modifications and variations of the present invention are possible in light of the above teachings. Therefore one may practice the invention otherwise than as the description specifically shows and describes.

What is claimed is:

1. A system for illuminating an area in a vehicle, comprising:
a source of ultraviolet light wherein said source of ultraviolet light illuminates at wavelengths of 4 nm to 400 nm and has a wattage of 1.5 to 30 watts; and
a surfacing material which has been treated with at least one of an optical brightener and a whitening agent that emits radiation when exposed to said ultraviolet light source directed at said surfacing material, wherein said surfacing material is placed 10-60 inches from said ultraviolet light source; and
wherein said surfacing material comprises a section having a plurality of fibers which have been treated with at least one of the optical brightener and the whitening agent, and a plurality of fibers which have not been treated with at least one of the optical brightener and whitening agent which are adjacent to said section having the plurality of fibers which have been treated with at least one of the optical brightener and the whitening agent; and
wherein the section of surfacing material having the plurality of fibers which have been treated with at least one of the optical brightener and the whitening agent is located in an area of the vehicle which does not receive direct light from a vehicle light source of the vehicle other than from the ultraviolet light source; and
wherein the ultraviolet light source and the surfacing material having the sections which have been treated and not been treated with at least one of the optical brightener and the whitening agent are positioned in a vehicle trunk; and
wherein the treated section of surfacing material is arranged with the ultraviolet light source on one or more side panels in the vehicle trunk such that, when ultraviolet light is directed at the treated section, a visible contrasting appearance is provided between the treated section and an object in the trunk placed on or adjacent to the treated section of surfacing material.

2. The system of claim 1 wherein said surfacing material comprises one or more of fibers, yarn, a non-woven, a knit, a web, flock and carpet.

3. The system of claim 1 wherein said optical brightener comprises a stilbene, a coumarin or a pyrazoline brightener.

4. The system of claim 1 wherein said whitening agent comprises 2,2'-(2,5-thiophenediyl)bis(5-tert-butylbenzoxazole).

5. The system of claim 1 wherein said whitening agent comprises sulphonated distyryl biphenyl.

6. The system of claim 1 wherein said optical brightener or said whitening agent is present at 0.1-5.0% by weight of said surfacing material.

7. The system of claim 1 wherein source of ultraviolet light illuminates at 320-400 nm.

8. A system for illuminating an area in a vehicle, comprising:
a source of ultraviolet light wherein said source of ultraviolet light illuminates at wavelengths of 4 nm to 400 nm and has a wattage of 1.5 to 30 watts; and
a surfacing material which has been treated with one of an optical brightener or whitening agent that emits radiation when exposed to said ultraviolet light source directed at said surfacing material, wherein said surfacing material is placed 10-60 inches from said ultraviolet light source, wherein said optical brightener or said whitening agent is present at 0.1-5.0% by weight of said surfacing material;

wherein said surfacing material comprises a section having a plurality of fibers which have been treated with at least one of the optical brightener and the whitening agent, and a plurality of fibers which have not been treated with at least one of the optical brightener and whitening agent which are adjacent to said section having the plurality of fibers which have been treated with at least one of the optical brightener and the whitening agent; and wherein the section of surfacing material having the plurality of fibers which have been treated with at least one of the optical brightener and the whitening agent is located in an area of the vehicle which does not receive direct light from a vehicle light source of the vehicle other than from the ultraviolet light source; and wherein the ultraviolet light source and the surfacing material having the sections which have been treated and not been treated with at least one of the optical brightener and the whitening agent are positioned in a vehicle trunk; and wherein the treated section of surfacing material is arranged with the ultraviolet light source on one or more side panels in the vehicle trunk such that, when ultraviolet light is directed at the treated section, a visible contrasting appearance is provided between the treated section and an object in the trunk placed on or adjacent to the treated section of surfacing material.

9. A method of illuminating a dark area in a vehicle, comprising:

providing a source of ultraviolet light, wherein said ultraviolet light source illuminates at wavelengths of 4 nm to 400 nm and has a wattage of 1.5 to 30 watts;

providing a surfacing material;

treating said surfacing material with at least one of an optical brightener and a whitening agent that emits radiation when exposed to said ultraviolet light source directed at said surface material;

placing said surfacing material 10-60 inches from said ultraviolet light source;

directing said ultraviolet light source at said surfacing material which is treated with at least one of the optical brightener and the whitening agent; and wherein said surfacing material comprises a section having a plurality of fibers which have been treated with at least one of the optical brightener and the whitening agent, and a plurality of fibers which have not been treated with at least one of the optical brightener and whitening agent which are adjacent to said section having the plurality of fibers which have been treated with at least one of the optical brightener and the whitening agent; and wherein the section of surfacing material having the plurality of fibers which have been treated with at least one of the optical brightener and the whitening agent is located in an area of the vehicle which does not receive direct light from a vehicle light source of the vehicle other than from the ultraviolet light source; and wherein the ultraviolet light source and the surfacing material having the sections which have been treated and not been treated with at least one of the optical brightener and the whitening agent are positioned in a vehicle trunk; and wherein the treated section of surfacing material is arranged with the ultraviolet light source on one or more side panels in the vehicle trunk such that, when ultraviolet light is directed at the treated section, a visible contrasting appearance is provided between the treated section and an object in the trunk placed on or adjacent to the treated section of surfacing material.

10. The method of claim 9 wherein said treating of said surface material comprises spraying said one of an optical brightener or whitening agent onto said surfacing material.

11. The method of claim 9 wherein said optical brightener comprises a stilbene, a coumarin or a pyrazoline.

12. The method of claim 9 wherein said whitening agent comprises 2,2'-(2,5-thiophenediyl)bis(5-tert-butylbenzoxazole).

13. The method of claim 9 wherein said whitening agent comprises sulphonated distyryl biphenyl.

14. The method of claim 9 wherein said surfacing material is dyed in a dye bath and said dye bath includes one of an optical brightener or whitening agent.

* * * * *